UNITED STATES PATENT OFFICE.

CARL STRAUB, OF SYRACUSE, NEW YORK.

COMPOSITION FOR USE IN THE MANUFACTURE OF ARTIFICIAL MARBLE.

SPECIFICATION forming part of Letters Patent No. 353,896, dated December 7, 1886.

Application filed February 23, 1886. Serial No. 192,943. (No specimens.)

*To all whom it may concern:*

Be it known that I, CARL STRAUB, of Syracuse, in the county of Onondaga and State of New York, have invented a new and Improved Composition or Building Material for Architectural Purposes, of which the following is a full, clear, and exact description.

My invention consists in the composition forming a new building material for various purposes, as will be hereinafter fully described and claimed.

In compounding the composition referred to, I mix glue and water together under a moderate heat, so as to produce a thick fluid, after which I add a quantity of boiled linseed-oil, the proportions being seven parts of the fluid to one of the oil. After the oil has been thoroughly intermixed with the gluey fluid I add either muriatic or sulphuric acid, adding about as much muriatic acid as I did oil; but if I use sulphuric acid, using only one-third as much. This mixture is thoroughly stirred for a quarter of an hour or more, having been kept heated up to this point. The mixture is then removed from the heat and stirred till cool. After cooling, the mixture is allowed to stand about three days, but during this time must be stirred three times a day for five or ten minutes at a time. At the end of three days the fluid will be found to be quite thin, and should then be covered, in order that it may be kept from the action of the atmosphere.

The solution above described may be kept almost any length of time desired, and when it is desired to form any quantity of artificial marble one part of the solution is mixed with twenty parts of water, the mixture readily dissolving in water. Plaster-of-paris is then sprinkled into the diluted solution, care being taken to stir the solution while the plaster is being added. Enough plaster should be added to form a dough as thick as molding-clay, which dough should be thoroughly kneaded, either by hand or by a proper kneading-machine. After this dough is formed it may be pressed into any shape or form desired, and may be colored by any of the well-known pigments.

If variegated marble is to be formed, separate batches of differently-colored doughs may be united, as will be well understood by those skilled in the art.

Artificial marble manufactured by the aid of my improved solution is particularly well adapted for ornamental work, as it is quickly and easily manipulated and is capable of receiving a high finish.

It will of course be understood that the dough could be pressed into ornamental shapes and forms as well as into plain flat tablets; and it will also be understood that the proportions of the ingredients may be varied, the main point being the materials employed and the method in which they are united.

Having thus fully described my invention, what I claim as new, and desire to secure by Letters Patent, is—

1. The herein-described composition of matter, to be used with plaster-of-paris and water for forming an artificial building material, consisting of glue, boiled linseed-oil, water, and acid, substantially as set forth.

2. The herein-described artificial building material, constructed of glue, boiled linseed-oil, water, acid, and plaster-of-paris, compounded in substantially the proportions and manner specified.

CARL STRAUB.

Witnesses:
SAMUEL S. RUSTON,
ALBERT W. CURTIS.